United States Patent
Brennan et al.

(10) Patent No.: US 10,228,255 B2
(45) Date of Patent: Mar. 12, 2019

(54) DETERMINATION OF A ROUTE OF A MOBILE DEVICE IN A MOBILE NETWORK

(71) Applicants: International Business Machines Corporation, Armonk, NY (US); Vodafone IP Licensing Limited, Berkshire (GB)

(72) Inventors: Damian F. Brennan, South Croydon (GB); Nichola Jane Inglis Hickman, Wallingford (GB); David Pollington, Berkshire (GB); Kevin T. Scarr, Berkshire (GB)

(73) Assignees: International Business Machines Corporation, Armonk, NY (US); Vodafone IP Licensing Limited, The Connection, Newbury Berkshire (GB)

(*) Notice: Subject to any disclaimer, the term of this patent is extended or adjusted under 35 U.S.C. 154(b) by 0 days.

(21) Appl. No.: 14/333,609

(22) Filed: Jul. 17, 2014

(65) Prior Publication Data

US 2016/0069692 A1    Mar. 10, 2016

Related U.S. Application Data

(63) Continuation of application No. 13/663,590, filed on Oct. 30, 2012, now Pat. No. 8,825,407.

(30) Foreign Application Priority Data

Dec. 21, 2011  (GB) .................................. 1121994.6

(51) Int. Cl.
*G01C 21/34* (2006.01)
*H04W 4/02* (2018.01)
(Continued)

(52) U.S. Cl.
CPC ............ *G01C 21/34* (2013.01); *G06Q 10/06* (2013.01); *G06Q 30/0261* (2013.01); *G08G 1/012* (2013.01); *H04W 4/029* (2018.02)

(58) Field of Classification Search
CPC . G01C 21/32; G08G 1/01; G08G 1/00; G08G 1/0104; G08G 1/104; G08G 1/012; H04W 64/00; G06Q 10/06
(Continued)

(56) References Cited

U.S. PATENT DOCUMENTS 6,125,278 A    9/2000  Wieczorek et al.
6,266,649 B1   7/2001  Linden et al.
(Continued)

FOREIGN PATENT DOCUMENTS

EP    2403290    1/2012
GB    2430067    3/2007
(Continued)

OTHER PUBLICATIONS

Combined Search and Examination Report under Sections 17 and 18(e); Intellectual Property Office (UK); dated Apr. 20, 2012; Application No. GB1121954.0; Applicant: Vodafone IP Licensing Limited et al.; Reference No. P101108-GB-NP; 10 pages.
(Continued)

*Primary Examiner* — Anne M Antonucci
(74) *Attorney, Agent, or Firm* — Schmeiser, Olsen & Watts, LLP; Mark Vallone; Lyle Ellis

(57) ABSTRACT

A method and system for determining a traveled route of a mobile device in a mobile network. A determination is made of a series of consecutive movements of the mobile device along a path of locations from an origin location of the path at an earliest activity of a plurality of activities of the mobile device to a destination location of the path at a latest activity of the plurality of activities. Historical sets of routes of the
(Continued)

mobile device are accessed from storage. At least one common route is ascertained from the set of routes, wherein the locations in each common route include all of the locations on the path. A common route of the at least one common route is designated as the traveled route of the mobile device.

18 Claims, 5 Drawing Sheets

(51) Int. Cl.
*G06Q 10/06* (2012.01)
*G08G 1/01* (2006.01)
*G06Q 30/02* (2012.01)
*H04W 4/029* (2018.01)

(58) Field of Classification Search
USPC .................................................. 701/540
See application file for complete search history.

(56) References Cited

U.S. PATENT DOCUMENTS

| | | | |
|---|---|---|---|
| 6,650,948 | B1 | 11/2003 | Atkinson et al. |
| 7,529,639 | B2 | 5/2009 | Rasanen et al. |
| 7,546,201 | B2 | 6/2009 | Lee et al. |
| 8,825,407 | B2 | 9/2014 | Brennan et al. |
| 2004/0079878 | A1 | 4/2004 | Vestal et al. |
| 2004/0102893 | A1 | 5/2004 | Atkinson et al. |
| 2005/0064844 | A1 | 3/2005 | McAvoy et al. |
| 2006/0266830 | A1 | 11/2006 | Horozov et al. |
| 2006/0293046 | A1 | 12/2006 | Smith |
| 2007/0165802 | A1 | 7/2007 | Fox |
| 2009/0197619 | A1 | 8/2009 | Colligan et al. |
| 2009/0239552 | A1 | 9/2009 | Churchill et al. |
| 2010/0004997 | A1 | 1/2010 | Mehta et al. |
| 2010/0145987 | A1 | 6/2010 | Harper et al. |
| 2010/0203876 | A1 | 8/2010 | Krishnaswamy |
| 2010/0223135 | A1 | 9/2010 | Griffin et al. |
| 2010/0280920 | A1 | 11/2010 | Scott et al. |
| 2011/0106436 | A1 | 5/2011 | Bill |
| 2011/0112908 | A1* | 5/2011 | Rowley .............. G06Q 30/0267 705/14.64 |
| 2011/0137557 | A1 | 6/2011 | de los Reyes et al. |

FOREIGN PATENT DOCUMENTS

| | | |
|---|---|---|
| GB | 2469327 | 10/2010 |
| GB | 2481715 | 1/2012 |
| WO | 0101367 | 1/2001 |
| WO | 2008111913 | 9/2008 |
| WO | 2011110227 | 9/2011 |

OTHER PUBLICATIONS

Combined Search and Examination Report under Sections 17 and 18(e); Intellectual Property Office (UK); dated Apr. 19, 2012; Application No. GB1121956.5; Applicant: Vodafone IP Licensing Limited et al.; Reference No. P101106-GB-NP; 8 pages.
Combined Search and Examination Report under Sections 17 and 18(e); Intellectual Property Office (UK); dated May 4, 2012; Application No. GB1121955.7; Applicant: Vodafone IP Licensing Limited et al.; Reference No. P101107-GB-NP; 6 pages.
Combined Search and Examination Report under Sections 17 and 18(e); Intellectual Property Office (UK); dated Apr. 27, 2012; Application No. GB1121957.3; Applicant: Vodafone IP Licensing Limited et al.; Reference No. P101121-GB-NP; 5 pages.
Calabrese et al.; The geography of taste: analyzing cell-phone mobility and social events; Proceedings of the 8th International Conference on Pervasive Computing; 2010; 17 pages.
Calabrese et al.; Real-Time Urban Monitoring Using Cell Phones: A Case Study in Rome; IEEE Transactions on Intelligent Transportation Systems; vol. 12; Mar. 2011; 12 pages.
Wang et al.; Transportation Mode Inference from Anonymized and Aggregated Mobile Phone Call Detail Records; 2010 13th International Annual Conference on Intelligent Transportation Systems; Sep. 19-22, 2010; 6 pages.
Valerio, Danilo; Road Traffic Information from Cellular Network Signalling; ftw. Technical Report; FTW TR-2009-03; Mar. 17, 2009; 51 pages.
Gonzalez et al; Understanding individual human mobility patterns; Nature; vol. 453; Jun. 5, 2008; pp. 779-782.
White et al.; Extracting Origin Destination Information from Mobile Phone Data; Road Transport Information and Control; Mar. 19-21, 2002, pp. 30-34.
Application No. 12198664.0, European Search Report, dated Aug. 14, 2013, 2 pages.
International Search Report for Reference No. GB920110138EP1, Application No./Patent No. 12198664.0-1803, dated Apr. 8, 2013, Applicant/Proprietor: International Business Machines Corporation, et al., 6 pages.
Vieira et al.; Querying Spatio-Temporal Patterns in Mobile Phone-Call Databases; 2010 11th International Conference on Mobile Data Management (MDM 2010); May 23-26, 2010; 11 pages.
Ashbrook et al.; Using GPS to Learn Significant Locations and Predict Movement Across Multiple Users; Journal of Personal and Ubiquitous Computing; vol. 7 Issue 5, Oct. 2003; pp. 275-286.
Akin et al.; Estimating Origin-Destination Matrices Using Location Information from Cellular Phones; 49th Annual North American Meetings of the Regional Science Association International; 2002; 7 pages.
Caceres et al.; Deriving Origin-Destination Data From a Mobile Phone Network; IET Intelligent Transport Systems, 2007, vol. 1 (1), pp. 15-26.
Calabrese et al.; Estimating Origin-Destination Flows Using Opportunistically Collected Mobile Phone Location Data From One Million Users in Boston Metropolitan Area; IEEE Pervasive Computing; vol. 10, Issue 4; Apr. 2011; pp. 36-44.
Cayford et al.; Operational Parameters Affecting the Use of Anonymous Cell Phone Tracking for Generating Traffic Information; Institute of Transportation Studies for the 82nd TRB Annual Meeting; Jan. 2003; 20 pages.
Sohn, K.; Dynamic Estimation of Origin-Destination Flows using Cell Phones as Probes; IEEE Transactions on Vehicular Technology; Sep. 2008; vol. 57 , Issue: 5; pp. 2703-2713.
Office Action (dated Dec. 17, 2013) for U.S. Appl. No. 13/663,590, filed Oct. 30, 2012.
Amendment (filed Mar. 17, 2014) for U.S. Appl. No. 13/663,590, filed Oct. 30, 2012.
Notice of Allowance (dated Apr. 16, 2014) for U.S. Appl. No. 13/663,590, filed Oct. 30, 2012.
Amendment 312 (filed May 19, 2014) for U.S. Appl. No. 13/663,590, filed Oct. 30, 2012.
Examination Report UK, Application No. 12 198 664.0, dated Jul. 26, 2016, 1 page.
Examination Report UK, Application No. 12 198 664.0-1803, dated Jan. 4, 2016, 4 pages.

* cited by examiner and a computer readable storage device coupled to the processor, said storage device containing program code configured to be executed by the processor via the memory to implement a method for determining a traveled route of a mobile device

DETERMINATION OF A ROUTE OF A MOBILE DEVICE IN A MOBILE NETWORK

This application is a continuation application claiming priority to Ser. No. 13/663,590, filed Oct. 30, 2012, now U.S. Pat. No. 8,825,407, issued Sep. 2, 2014.

TECHNICAL FIELD

The present invention relates to the field of mobile networks. In particular, the invention relates to a method, system, apparatus and a computer program product for determining a common origin, a common destination and a common route from a network data record generated from network activity of a mobile device.

BACKGROUND

Traffic planning and forecasting is required for determining how traffic flow will impact a transport infrastructure. The transport infrastructure includes roads and public transport. Transport infrastructure continually needs updating and it is important to identify where traffic is most densely concentrated. Traffic concentration can change over time due to events taking place or due to environmental and social changes. For example, more people may be choosing to live in or in close proximity to a city or a town, etc. Thus more transport facilities may be required in particular areas.

In order to carry out traffic planning and forecasting, planners need to gather data. Typical methods for gathering data include answers to census questionnaires, answers to household questionnaires, road/public transport surveys, GPS trackers placed in vehicles or looking at an average traffic flow of a road network model, etc. Each of these methods is expensive, lacks accuracy and may sample only a small proportion of a country's population.

Mobile phone operators may collect information about call events, including telephone calls, Short Message Service (SMS) and mobile data retrieval etc. This information is a vast resource of unstructured information that is collected by mobile phone operators for billing purposes etc. There have been a number of studies into the use of this data for determining the flow of traffic through commuter routes, for determining location based services and targeted advertising.

However, misleading results are given for those users of mobile phones who do not use their mobile phone on a regular basis.

BRIEF SUMMARY

The present invention provides a method for determining a traveled route of a mobile device in a mobile network, said method comprising:

analyzing, by a processor of a computer system, a network usage record that identifies a plurality of activities of the mobile device and associated activity information pertaining to each activity, wherein for each activity the associated activity information includes a start cell in which the activity was initiated, an end cell in which the activity was terminated, a start time at which the activity was initiated, and a time duration of the activity, and wherein the start time and duration for each activity defines a time interval that does not overlap the time interval defined for each other activity;

said processor determining, from the activity information of the activities, a series of consecutive movements of the mobile device along a path of locations from an origin location of the path at an earliest activity of the plurality of activities to a destination location of the path at a latest activity of the plurality of activities;

said processor accessing from storage a plurality of historical sets of routes of the mobile device, wherein each route is a set of locations from an origin location to a destination location of the route;

said processor ascertaining from the set of routes at least one common route, wherein the locations in each common route include all of the locations on the path, wherein the origin location of each common route is the origin location of the path, and wherein the destination location of each common route is the destination location of the path; and said processor designating a common route of the at least one common route as the traveled route of the mobile device with respect to the series of consecutive movements of the mobile device along the path.

The present invention provides a computer program product, comprising a computer readable storage medium having computer readable program code stored therein, said program code containing instructions configured to be executed by a processor of a computer system to implement a method for determining a traveled route of a mobile device in a mobile network, said method comprising:

said processor analyzing a network usage record that identifies a plurality of activities of the mobile device and associated activity information pertaining to each activity, wherein for each activity the associated activity information includes a start cell in which the activity was initiated, an end cell in which the activity was terminated, a start time at which the activity was initiated, and a time duration of the activity, and wherein the start time and duration for each activity defines a time interval that does not overlap the time interval defined for each other activity;

said processor determining, from the activity information of the activities, a series of consecutive movements of the mobile device along a path of locations from an origin location of the path at an earliest activity of the plurality of activities to a destination location of the path at a latest activity of the plurality of activities;

said processor accessing from storage a plurality of historical sets of routes of the mobile device, wherein each route is a set of locations from an origin location to a destination location of the route;

said processor ascertaining from the set of routes at least one common route: (i) whose locations include all of the locations on the path, (i) whose origin location is the origin location of the path, and (iii) and whose destination location is the destination location of the path; and said processor designating a common route of the at least one common route as the traveled route of the mobile device with respect to the series of consecutive movements of the mobile device along the path.

The present invention provides a computer system comprising a processor, a memory coupled to the processor, and a computer readable storage device coupled to the processor, said storage device containing program code configured to be executed by the processor via the memory to implement a method for determining a traveled route of a mobile device in a mobile network, said method comprising:

said processor analyzing a network usage record that identifies a plurality of activities of the mobile device and associated activity information pertaining to each activity, wherein for each activity the associated activity information includes a start cell in which the activity was initiated, an end cell in which the activity was terminated, a start time at which the activity was initiated, and a time duration of the activity, and wherein the start time and duration for each activity defines a time interval that does not overlap the time interval defined for each other activity;

said processor determining, from the activity information of the activities, a series of consecutive movements of the mobile device along a path of locations from an origin location of the path at an earliest activity of the plurality of activities to a destination location of the path at a latest activity of the plurality of activities;

said processor accessing from storage a plurality of historical sets of routes of the mobile device, wherein each route is a set of locations from an origin location to a destination location of the route;

said processor ascertaining from the set of routes at least one common route: (i) whose locations include all of the locations on the path, (i) whose origin location is the origin location of the path, and (iii) and whose destination location is the destination location of the path; and said processor designating a common route of the at least one common route as the traveled route of the mobile device with respect to the series of consecutive movements of the mobile device along the path.

DETAILED DESCRIPTION

Figure 1:
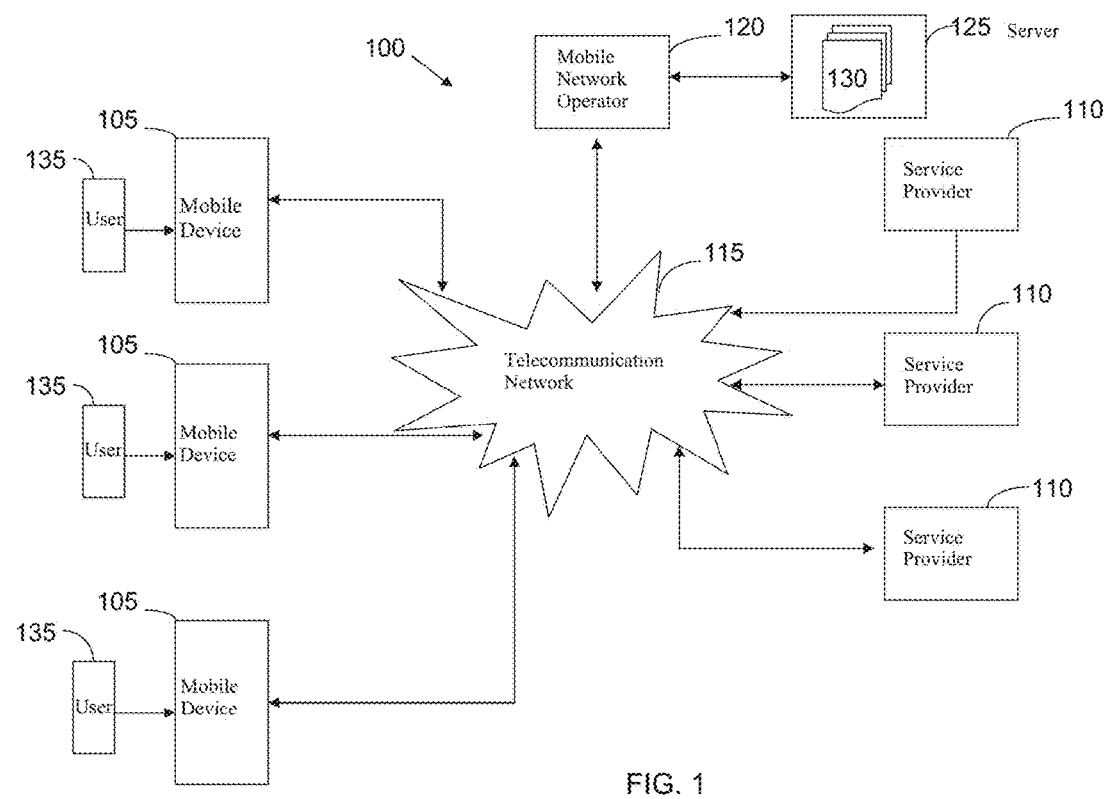
FIG. 1 is a block diagram depicting a mobile network in accordance with embodiments of the present invention.

The present invention provides a method for determining a common origin, a common destination and a common route from a network usage record of a mobile device of a user in a mobile network. The method comprises the steps of: analyzing a network usage record for determining a movement of the mobile device, wherein a movement is determined from the mobile device's network activity and attributes associated with the activity identified in the network usage record; analyzing if the determined movement of the mobile device is preceded or followed by a subsequent movement for determining a series of consecutive movements of the mobile device; in response to a positive determination, aggregating the subsequent movement to form the series of consecutive movements of the mobile device, wherein the series of consecutive movements represent points along a route; comparing the formed series of consecutive movements of the mobile device to a historical set of series of movements of the mobile device for determining a common set of a series of consecutive movements; and identifying from the determined common set of the series of consecutive movements, a common origin and a common destination and one or more end points between the common origin and common destination wherein the common origin, one or more end points and the common destination represent a route.

The present invention provides a method further comprising aggregating at a traffic management system the common origin, the common destination and the common route for controlling one or more components of said traffic management systems.

The present invention provides a method wherein the step of determining a movement from an activity and the activity's attributes identified in the network usage record further comprises comparing the activity and its attributes with one or more historical activities and attributes of the mobile device to determine a relationship between one or more attributes, wherein a relationship identifies a movement of the mobile device.

The present invention provides a method wherein the step of analyzing if the determined movement is preceded or followed by a subsequent movement further comprises the step of determining a time period between the determined movement and the subsequent movement and an originating and destination cell ID for the determined and subsequent movement.

The present invention provides a method further comprising determining a longest route having a common origin and a common destination.

The present invention provides method further comprising determining if a common route is identified within the longest route to identify anomalies.

The present invention provides a method wherein a movement is a distance traveled by a mobile phone within a geographical area.

The present invention provides a method wherein mobile device activity is selected from the group comprising: a voice call, a video call, a SMS, a Multimedia Messaging Service (MMS), data access, data upload and download etc.

The present invention provides a method wherein an attribute comprises one or both a cell ID of a cell in which activity was initiated, a cell ID of a cell in which activity was terminated.

The present invention provides a method further comprising identifying from the common route or the longest route one or more anchor locations.

The present invention provides a method further comprising analyzing network usage records of other users of mobile devices to determine a common route for a totality of mobile network provider's users of mobile devices.

Advantageously, the present invention provides a means in which network usage records can be analyzed to determine an origin, a destination a route for a journey frequently undertaken by a user of a mobile device. The present invention analyzes the data recorded in a network usage record to determine a common origin, a common destination and a common route even when no mobile phone call has taken place.

Advantageously, a mobile device's activity data is compared with historical activity data associated with the mobile device. Patterns of activity are inferred from the comparison. Advantageously, by matching fragments of activity data with historical data patterns of activity may be inferred.

Advantageously, by utilizing network usage data to determine mobile device activity to determine the start location and end location of a detected movement, and comparing this with a generated historical profile of all movements for a given mobile device, the actual origin and destination of the full journey can be inferred even though no mobile device activity has taken place. This method has the advantage that an origin, destination and a route may be inferred for a given mobile device even when the network usage record is incomplete because no activity has taken place.

Advantageously, the identified common route, common origin and common destination are aggregated by a traffic planning system for controlling one or more components of the traffic planning system. For example, as each common route is identified for a user, this common route is communicated the traffic planning system. This process is carried for all network activity records generated by a user accessing the mobile network. The traffic planning system therefore, obtains a real-time view of the density of traffic along journey paths in the transport infrastructure. The traffic management system is then able to make informed decision about traffic planning, such as communicating traffic alerts, redirecting traffic, closing roads and opening new roads along new routes etc.

Advantageously, the identified common route, common origin and common destination can be communicated to a CRM (customer relationship management) system in order to send location based information to a user, such as traffic reports or advertisements based on the identified end destination of the journey, even before the user has reached their destination. Optionally this can be tailored based on user preferences and other information concerning the user derived from their mobile device usage and from other sources, e.g. from a geodemographic segmentation or the user's response to previous advertisements.

The present invention provides an apparatus for determining an origin, a destination and a route from a network usage record of a mobile device of a user in a mobile network, the method comprising the steps of: an analysis component for analyzing a network usage record for determining a movement of the mobile device, wherein a movement is determined from the mobile device's network activity and attributes associated with the activity identified in the network usage record; an inference engine for analyzing if the determined movement of the mobile device is preceded or followed by a subsequent movement for determining a series of consecutive movements of the mobile device; in response to a positive determination, an analysis component for aggregating the subsequent movement to form the series of consecutive movements of the mobile device, wherein the series of consecutive movements represent points along a route; an inference engine for comparing the formed series of consecutive movements of the mobile device to a historical set of series of movements of the mobile device for determining a common set of a series of consecutive movements; and an analysis component for identifying from the determined common set of the series of consecutive movements, a common origin and a common destination and one or more end points between the common origin and common destination wherein the common origin, one or more end points and the common destination represent a route.

The present invention provides a computer program comprising computer program code to, when loaded into a computer system and executed, perform all the steps of the present invention as described above.

Figure 2:
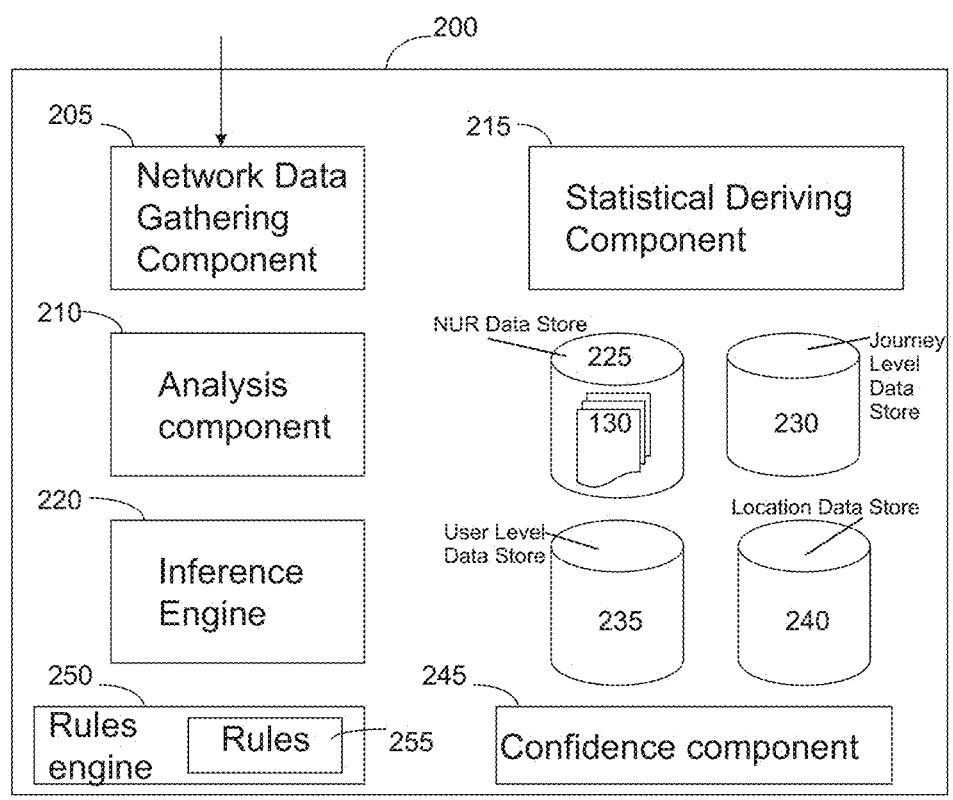
FIG. 2 is a block diagram depicting a route determination component in accordance with a embodiments of the present invention.
Figure 3:
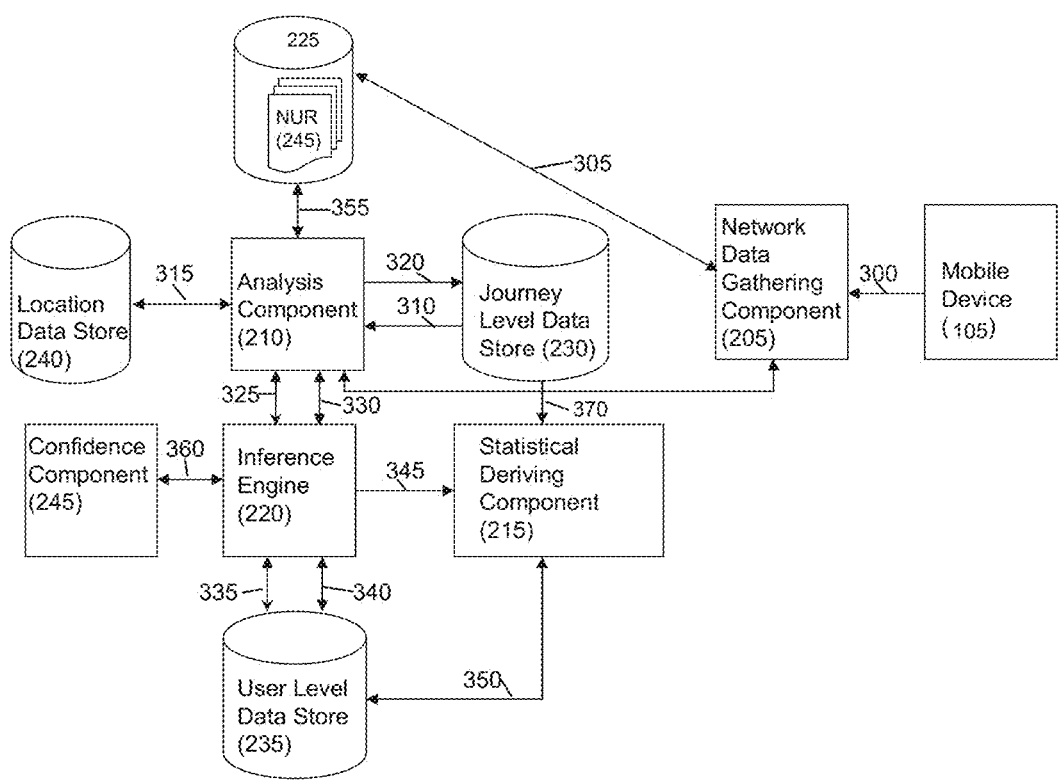
FIG. 3 is a flow diagram depicting the process flow between sub components of the route determination component in accordance with embodiments of the present invention.
Figure 4:
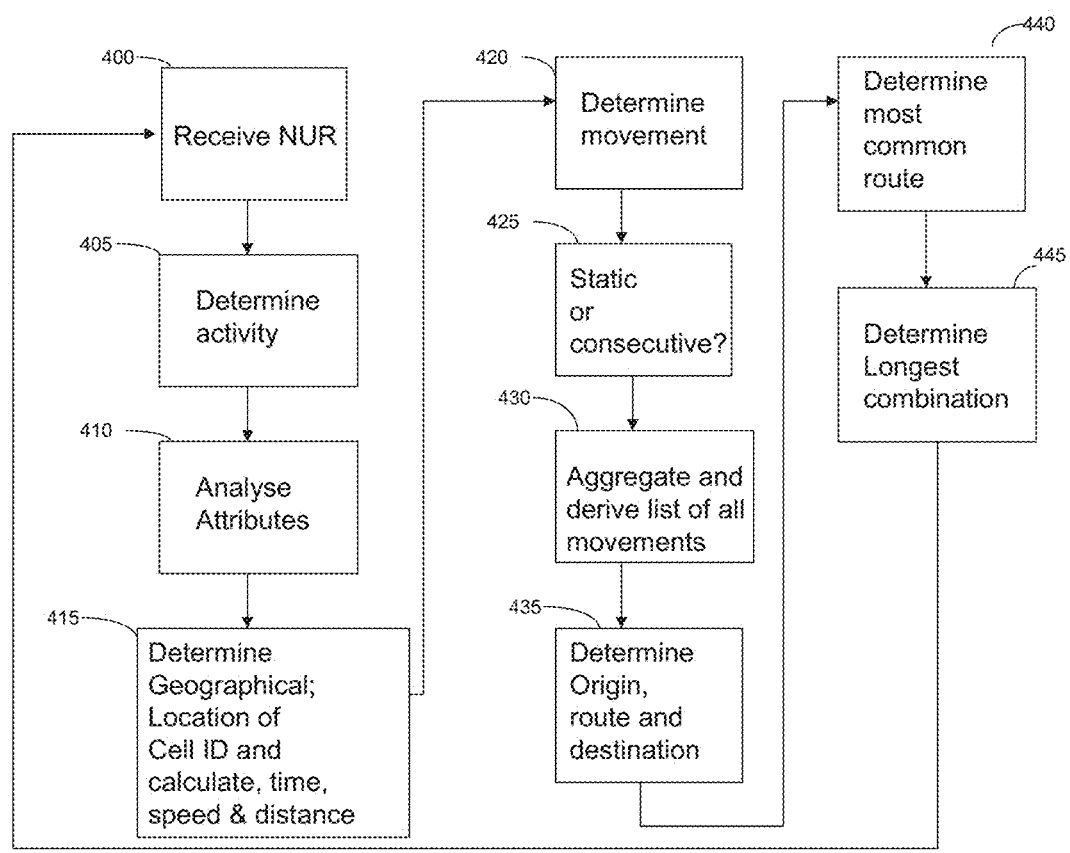
FIG. 4 is a block diagram depicting further processing steps of the route determination component in accordance with embodiments of the present invention.

The present invention provides a method, apparatus and computer program as substantially described herein with reference to and as illustrated by the accompanying drawings of FIGS. 2 to 4.

FIG. 1 depicts a representation of a mobile network arrangement 100 in which embodiments of the invention may be implemented. A mobile network 100 comprises a telecommunication network 115, such as, a GSM, 3G or 4G telecommunications network which is the medium used to provide communication links between various mobile devices 105 connected together within the mobile network 100. The telecommunications network 115 comprises a plurality of cells (not shown) each cell being associated with a base station and providing network coverage to a predetermined geographical area.

In the depicted example of FIG. 1, service providers 110 and users 135 (via mobile devices 105) connect to the telecommunication network 115. The telecommunication network 115 is operated by one or more mobile network operators 120. Mobile network operators 120 provide telecommunication services to users 135, such as, subscribers, and allow users to make phone calls, send text messages and access internet based resources provided by internet service providers 110.

Users 135 may access the telecommunication network 115 by means of personal computers, mobile devices, handheld devices, smart phones or any type of pervasive device that is capable of initiating and/or receiving a phone call, sending and receiving of text messages or requesting, accessing and receiving resources such as a web page, information resources, data, online applications, data files and payloads, etc. For clarity these devices will be termed 'mobile devices'.

Mobile network 100 may comprise additional servers, clients and other communication devices which are not illustrated in the figures.

Mobile network operators 120 manage one or more of network connected servers 125. Network connected servers 125 collect and store network usage records (NUR) 130 that comprise information concerning mobile device activity, for example voice calls, messaging, data downloads and any other activity which requires access to resources from the telecommunication network 115 etc.

A network usage record 130 comprises data about the mobile device's 105 activity and its associated attributes, for example, details about the caller who is initiating a phone call, the party receiving the call, the start and end location of the calling party, including the cell ID and location ID, the start and end times of the call and other information such as the type of call and the volume of data used.

The network usage record 130 may comprise a unique identifier for identifying the mobile device 105 of the user 135, a cell ID or location ID in which the call activity was initiated, the identifier of the calling party, an identifier of a receiving party, the cell ID associated with the cell in which the call activity was terminated, the duration of the activity and the activity type, for example, a voice call, SMS message sent or received or browsing a web page on the Internet and other information such as, the date and time of the detected event. A person skilled in the art will realise that other types of activity associated with a mobile device 105 may be gathered without departing from the scope of the invention.

FIG. 1 is intended as an example only and not as an architectural limitation for different embodiments.

FIGS. 2 and 3 illustrate a route determination component 200 in accordance with a preferred embodiment of the present invention.

The route determination component 200 may either be implemented as a server side application under the control of a mobile network operator 120 or the route determination component 200 may be operable on a mobile device 105 and interacting with network usage records 130 gathered by the mobile network operator 120.

The route determination component 200 analyzes activities identified in one or more network usage records 130 in order to determine frequently occurring movements of the user 135 of the mobile device 105 in order to infer an origin and a destination of a route or journey. An activity may be any form of activity that is recorded about or associated with a mobile device 105, for example, initiation of a phone call, sending of a text message etc.

Optionally, information can be logged relating to an active mobile device moving from one cell to another whether or not a call has been initiated. A movement may be a single continuous detected activity having a start and end cell (the start and end cells may be different or the same). A journey may be defined as a series of movements in a period of time, in which case, the start cell may be the first cell and the end cell may be the last cell in the series of movements. A plurality of consecutive movements may form points along a path of a journey.

The route determination component 200 comprises a number of components which interface, interact and communicate with each other in order to provide the advantageous benefits of the present invention. These components comprise a network data gathering component 205, an analysis component 210, an inference engine 220, a statistical deriving component 215, a confidence component 245 and a plurality of data stores, namely, a location data store 240, journey level data store 230, a user level data store 235 and a network usage record data store 225.

The network data gathering component 205 gathers mobile device activity generated by a mobile device 105 operating in the telecommunication network 115 via communication path 300. The network gathering component 205 stores the gathered information in a network usage record 130 in a data store 225 via communication path 305.

An analysis component 210 interfaces with the network usage record data store 225 via communication path 355 to access a network usage record 130 of a mobile device 105. The analysis component 210 continually requests access to the data store each time new activity is recorded.

The analysis component 210 interfaces with the inference engine 220 via communication paths 325 and 330, which in turn communicates with a rules engine 250 comprising rules 255 for determining frequently occurring movements of the user 135 of the mobile device 105 in order to infer an origin and a destination of a route or journey. The inference engine 220 determines the most frequent route undertaken by a user 135 and also determines a longest route undertaken by the user 135 in order to consider fragments of activity data which may be part of unobserved origin and destination locations.

The analysis component 210 communicates with a location data store 240 via communication path 315 for storing information regarding the geographical location of a cell and optionally other geographical relevant information, such as, point of interest relating to a particular geographically location.

The analysis component 210 (and the inference engine 220 via the analysis component 210) communicates with journey level data store 230 via communication paths 310 and 320 and stores information in the level data store 230 regarding a history of all journey paths taken by a user 135 of a mobile device 105.

The user level data store 235 comprises records of the inferred common routes for each mobile device 105 an optionally anchor locations for each mobile device 105 etc. The user level data store 235 is accessed directly by the interference engine 220 via communication paths 335 and 340, and indirectly by the analysis component 210 via the inference engine 220.

The statistical deriving component 215 interfaces with the inference engine 220 via communication path 345, the journey level data store 230 via communication path 370, and the user level data store 235 via communication path 350. The statistical deriving component 215 derives statistical calculations relating to inferred origins and destination for a mobile device at communication paths 345 and 350. The inference engine 220 communicates with a confidence component 245 via communication path 360.

The confidence component 245 determines and stores a confidence value of a movement by determining whether it is likely that a mobile device 105, without moving, can be picked up by both cell towers (i.e. by cell towers in an old cell and a new cell). This can be done a number of ways, for instance by computing, analyzing, and storing the ratio of the sum of the coverage radius of the old cell and the new cell to the distance between the tower of the old cell and tower of the new cell, or alternatively the distance between the centroid of the old cell and the new cell. The confidence component 245 returns a value indicating whether the confidence is high or low based on the ratio (i.e., the confidence, which is a function of the ratio, increases as the ratio increases and decreases as the ratio decreases).

With reference to FIG. 4, the analysis component 210 begins by analysing a network usage record 130 for a given mobile device 105, at step 400. The analysis component 210 analyzes each of the attributes associated with a recorded activity at steps 405 and 410. As an example, if the network usage record 130 may states that on a given date and at a given time, a voice call was initiated to a receiving party for a given duration for a particular location in an identified cell. The activity is determined to be the voice call and the attributes are: time, date, cell ID, geographical location etc.

As a further example, the network usage record 130 may state that a voice call (activity) was initiated at 10:00 am on the 30 Oct. 2011 in cell 'A', the call lasted ten minutes, the activity type was a voice call and the calling party ended the call in cell 'B' (time, date, cell ID, call duration etc are attributes). The analysis component 210 analyzes the above activity and attributes and determines that the geographical location of cell 'A' is a geographical area within the county of Hampshire at step 415. This is achieved by searching a database of geographical locations associated with each cell ID. Optionally, the analysis component 210 may have access to GPS data which can more accurately locate the subscriber's location; i.e., a specific address of the subscriber's location.

From this information the analysis component 210 determines a start location (origin) from the cell ID in which the call was initiated (the first cell) and a finish location (destination) from the cell ID in which the call was terminated (the last cell) as well as calculating time, distance, direction and speed of travel. The analyzed activity data is stored in the journey level data store 230 for further analysis by the inference engine 220 in order to determine a) if this activity data is a movement and b) whether this activity data is preceded or followed by another determined movement in order to construct a series of movement of the mobile device 105 at step 420.

Thus, steps 405, 410, and 415 collectively analyze a network usage record that identifies a plurality of activities of the mobile device 135 and associated activity information pertaining to each activity. Each activity the associated activity information includes, inter alia, an identifier of the mobile device 135, a start cell in which the activity was initiated, an end cell in which the activity was terminated, a start time at which the activity was initiated, and a time duration of the activity. In one embodiment, the start time and duration for each activity defines a time interval that does not overlap the time interval defined for each other activity in the network usage record. In one embodiment, times during which activities occur may overlap and/or coincide in time In step 420 the analysis component 210 may determine that the start and end cells are different cells and therefore the mobile device has moved from one geographical location to another. Alternatively, the analysis component 210 may determine that the start location and the finish location of a recorded activity were in the same cell. In this instance of attributes are taken into consideration such as: a movement is only defined as stationary if there are two or more sequential events in the same location and, for example, these two sequential events took place within a predefined period of time; e.g., a ten minute time period at step 425.

In order to infer a movement at step 420, the analysis component 210 analyses the activity data in combination with historical activity data stored in the journey level data store 230. This step 420 is to determine whether the activity data can be inferred to have a relationship with previously recorded activity data; for example, if a voice call took place within a ten minute time frame of a previously recorded voice call or SMS message was sent within a ten minute time frame. Using this information along with other recorded or calculated attributes such as cell ID, distance, direction and speed, the inference engine 220 can begin to generate a series of movements of the mobile device 105.

A person skilled in the art will also realize that in some geographical areas, base stations associated with cells are more densely populated than in other geographical areas. Hence, in more densely populated areas the determination of the geographical location of the mobile device is more precise.

In order to determine these inferences the analysis component 210 may also access information such as the radius of each individual cell and whether any of the cells in the mobile network overlap and the geographical distance of the cell overlap.

For each recorded activity, the analysis component 210 along with the inference engine 220 determines, firstly, whether a recorded activity constitutes a movement (static or part of a series of consecutive movements) of the mobile device 105 (step 425). For each determined movement, a start location (from the cell ID associated with the start of the, for example, phone call), a finish location (from the cell ID associated with the finish of the, for example, phone call) and any other movement in between the start and the finish locations. The recorded activity is aggregated and a list of all movements is derived (step 430).

Thus, steps 420, 425, and 430 collectively determine, from the activity information of the activities, a series of consecutive movements of the mobile device along a path of locations from an origin location of the path at an earliest activity of the plurality of activities to a destination location of the path at a latest activity of the plurality of activities. In one embodiment, a longest time interval between consecutive activities of the consecutive movements is less than a specified time interval threshold.

Step 435 accesses from storage a plurality of historical sets of routes of the mobile device 135, wherein each route is a set of locations from an origin location to a destination location of the route. Step 435 ascertains from the set of routes at least one common route, wherein the locations in each common route include all of the locations on the path of locations, wherein the origin location of each common route is the origin location of the path, and wherein the destination location of each common route is the destination location of the path.

Step 440 designates a common route of the at least one common route as the traveled route of the mobile device with respect to the series of consecutive movements of the mobile device along the path. In one embodiment the designated common route is the most frequently route of the at least one common route.

In one embodiment the designated common route is the longest route of the at least one common route (step 445).

In one embodiment the designated common route comprises at least one intermediate location not on the path.

In one embodiment, the at least one common route consists of a plurality of routes, wherein the plurality of routes include routes of varying length.

Movements in-between the start and finish locations may be determined by recording further cell IDs through out the duration of the recorded activity. As already stated, if a mobile device is switched on and active, information such as cell handover is recorded even if no call has been initiated.

For any given journey a user 135 may initiate, for example, a voice call, multiple voice calls or text messaging. Each of these activities and their attributes are recoded in the network usage record. A voice call may take place at the start or end of a journey, or at various times throughout a journey—each phone call lasting for a period of time. Therefore as this activity is recorded, the analysis component 210 is able to derive a series of movements associated with the activity of a mobile device 105. This is illustrated in Example 1.

Example 1

Mobile device 001
$4^{th}$ October 10:00 am
Voice call
Cell ID: start cell 'A'
Cell ID: end cell 'B'
Duration 10 minutes
$4^{th}$ October 11:00 am
SMS message sent
Cell ID: start cell 'B'
Cell ID: end cell 'C'
Duration 5 minutes
$4^{th}$ October 11:25 am
Data download
Cell ID: start cell 'C'
Cell ID: end cell 'C'
Duration 1 minute Once the activity has been recorded, the analysis component 210, records the series of movements in the journey level data store 240. A series of movements may be based on a date or time for example, all movements occurring within a time period of less that two hours or ending in a series of a stationary events.

The journey level data store 240 over a period of time comprises a store of a historical set of movements for each mobile device 105 associated with a user of the telecommunication network 115.

Each of the stored series of movements can be very complex as combinations of origin and destinations are built up over a period of time. For example, a user 135 may initiate a voice call at the start of a train journey from London to Edinburgh. In this instance, a call may be made at the start (origin) of the trip (i.e., London) and last for only a few minutes and takes place before the train departs for Edinburgh. The cell ID of the start and finish of the call is recorded in the network usage record along with other relevant information such as the date and time and call type etc. The user 135 may initiate other phone activity along the journey from London to Edinburgh, for example, downloading music or reading an on-line newspaper, etc.

Alternatively, the user 135 may not initiate any further mobile device activity until having reached Edinburgh. In this instance, the network usage record will be updated to comprise two entries (i.e., the call activity in London and the call activity in Edinburgh).

The analysis component 210 compares this activity to previous activity in the network usage record 130 to determine whether this is a 'one off' activity or whether this activity is part of a consecutive series of activities (for example an activity being recorded within ten minutes of the previous recorded activity). For example, if the user initiated other mobile device activity along the journey from London to Edinburgh, for example, downloading music, reading an on-line newspaper etc., and the cell ID indicated for each activity type a geographical location of York and Darlington. The inference engine 220 may then infer that the user has traveled between locations in York and Darlington. If the user has traveled between those locations in York and Darlington in journeys that also included London and Edinburgh the inference engine may infer that the user was travelling between London and Edinburgh via York and Darlington.

In another embodiment, if there is limited historical network usage data associated with a user, the analysis engine 210 may access historical network usage data of other users. The analysis component 210 analyzes a collection of historical data from one or more users and, based on the most frequent route taken by the one or more users assigns this route as the most probable route if the inference engine infers a high degree of similarity between the user's route and the most frequent route taken by the one or more users routes.

As further activity is recorded the analysis component 210 determines if a movement is immediately preceded or followed by another movement in order to derive a series of consecutive movements which define a path of a journey by combining sequential events for a user, based on time between the activities (for example, a time period of less than two hours). For example, referring back to example 1, it can be seen that based on the time of each recorded activity, the movements appear to be consecutive since the longest time interval between activities is less than a specified time interval threshold of two hours in this example.

The analysis component 210 creates a list of cells, or locations that the mobile device 105 has been recoded as passing through (refer to Example 1). This is repeated for each activity recorded in the network usage record, such that, each recorded activity is either determined to be a singular static activity (no recorded activities preceding the recorded activity based on a date or time period) or is determined to be a series of consecutive movements at step 425. The inference engine 220 derives a list of historical unlinked movements and linked sequential movements at step 430 and shown in Example 2 below. The list may be a time or date ordered list of movements.

Example 2

AB
AP
CDE
DE
ABC
ABE
ABCDE
AE
DE
ABE
AE
DP

The inference engine 220 analyzes the ranked list and defines the start and end location as the origin and destination as shown in Example 3.

Example 3

AB—A is origin, B is destination
AP—A is origin, P is destination
CDE—C is origin, E is destination
DE—D is origin, E is destination
ABC—A is origin, C is destination
ABE—A is origin, E is destination
ABCDE—A is origin, E is destination
AE—A is origin, E is destination
DE—D is origin, E is destination
ABE—A is origin, E is destination
AE—A is origin, E is destination
DP—D is origin, P is destination The inference engine 220 determines from the above list any consecutive movements with the same origin and destinations and these are further aggregated together taking the longest combination as the route; e.g., at step 445 and as shown in Example 4.

Example 4

ABCDE
CDE
ABC
AP
DP

Therefore using the example of Example 4 ABCDE is defined as the longest route. The longest route takes into account all inferred movements over a given time period and considers fragments of unobserved origins and destinations that might not have previously been considered.

Routes that share the same origin and destination are aggregated and take the intermediate steps of the longest route for that origin destination combination.

The analysis component 210 also determines the most common route for the user i.e. the most frequent route or journey undertaken by a user at step 435.

The inference engine 220 analyzes the most recently received determined series of movements stored in the user level data store 235. The inference engine 220 ranks all series of movements by frequency of occurrence. The inference engine 220 identifies the most commonly occurring route and searches the remaining series of movements for series of movements that are entirely contained within the most common route, for example, considering the series of movements ABCDE, AP is not in ABCDE thus disregard, CDE is contained within ABCDE so add its record count to the record count of ABCDE and remove CDE from the list (a list of fragments) and continue to do this until the end of the list is reached.

Once this has been completed, the process is repeated for the second most frequently occurring route.

For example, from the data at the start the inference engine 220 would output the following at step 440:
ABCDE (10)
AP (1)
DP (1)

In another embodiment, the statistical deriving component 215 analyzes the identified static common locations to determine a percentage of time in which a user has spent in a static location. For example, 60% of a user's time is spent in cell A, 20% in cell E, 15% in cell F, 4% in cell X, 2% in cell Y. The statistical deriving component 215 sums the total stationary time—e.g., if an activity takes place at 9 am and an activity takes place at 5 pm in the same location the assumption is that the mobile was stationary in that location for 8 hours. The statistical deriving component 215 ranks the results to derive one or more anchor locations. The inference engine 220 infers from this information that an anchor location signifies that the user spends the majority of the time at this location. As an example, Example 5 illustrates a list of cell IDs in bold which represent inferred anchor locations.

Example 5

AB
AP
CDE
DE
ABC
ABCDE
AE
DE
AE
DP

In the above example of Example 5 only anchor locations are designated as origin and destinations locations (shown in bold typeface).

As new activity is recorded in a network activity record, the analysis component 210 and the inference engine 220 looks up the ID of the mobile device 105, accesses the network usage record 130 associated with the mobile device 105 and in real time, using the current recorded activity for the mobile device in combination with the determined most common route that the user has traveled through, infers if the new activity is part of the user's inferred common route and as a result can instigate further services such as traffic alerts, location based services, etc.

Therefore a common origin and a common destination of a common route from a plurality of network activity records are determined for a mobile device in a data processing network. For each entry in the plurality of network activity records, a determination is made to identify if an entry is a movement of the mobile device from a first cell or derived location to a second cell or derived location and for each determined movement, determining if one of the determined movements is preceded or proceeded by another one of the determined movements to form one or more sequences of time ordered movements. A further determination is made for identifying from one or each of the sequences of time ordered movements, a first location and a last location and each of the determined first locations and last locations are analysed for identifying a list of frequently recorded combinations of first locations, last locations and one or more intermediate locations, wherein the first location is identified as a common origin of a route and the last location is determined as a common destination of a route. Intermediate locations are journey points along a route. A new determined sequence of time ordered movements for a mobile device is received and compared with the list of frequently recorded common origins and common destinations with the new determined sequence of time ordered movements for determining a new common origin and common destination of a common route.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product comprising a computer-usable or computer-readable medium or device containing program code for execution by a computer, a computer system or any instruction execution system to implement the methods of the present invention.

The medium or device can be an electronic, magnetic, optical, electromagnetic, infrared, or semiconductor medium, apparatus, or device. Examples of a computer-readable medium or device include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Figure 5:
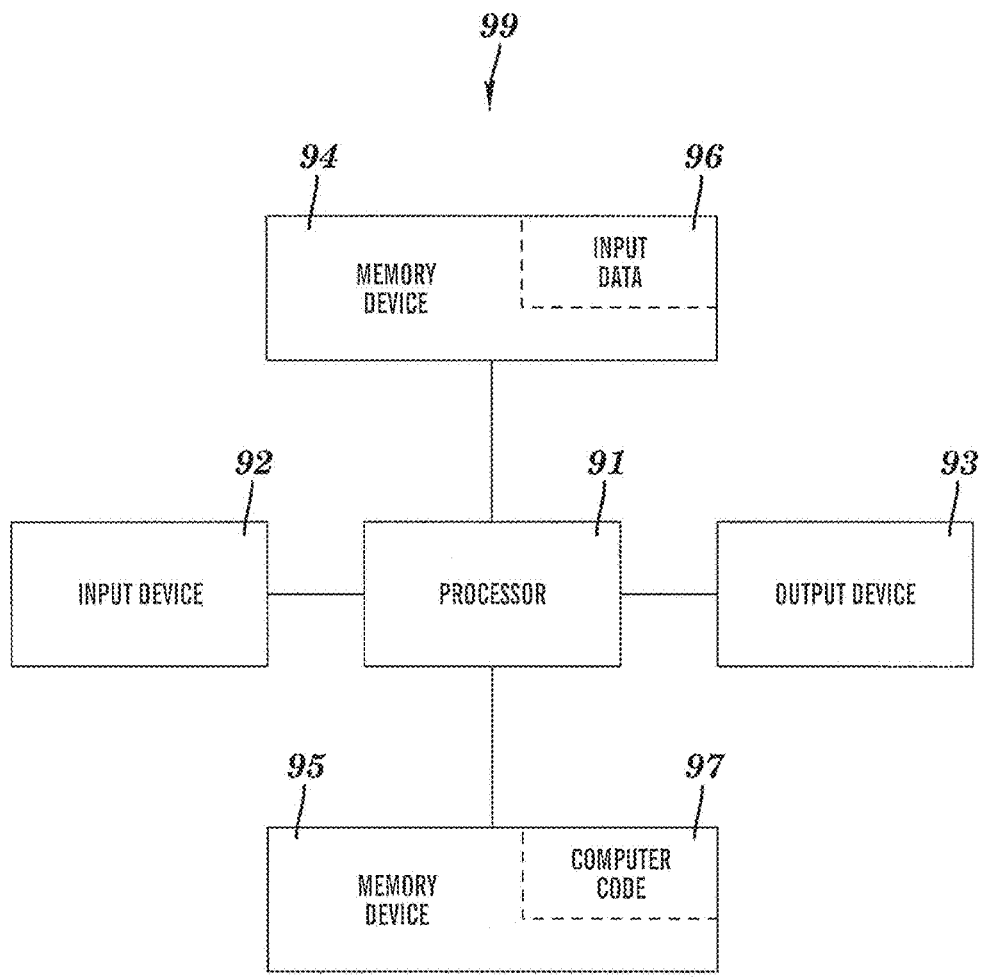
FIG. 5 illustrates a computer system 90 used for performing the methods of the present invention in accordance with embodiments of the present invention.

FIG. 5 illustrates a computer system 90 used for performing the methods of the present invention in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes software or program instructions that may implement the methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may be used as a computer readable storage medium or device having a computer readable program stored therein and/or having other data stored therein, wherein the computer readable program comprises the computer code 97. Generally, a computer program product of the computer system 90 may comprise a computer readable storage medium or device that has the computer readable program code 97 stored therein, wherein the program code contains instructions configured to be executed by the processor 91 to implement the methods of the present invention. The computer system 90 comprises a processor, a memory coupled to the processor, and a computer readable storage device coupled to the processor, said storage device containing program code configured to be executed by the processor via the memory to implement the methods of the present invention.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

Improvements and modifications can be made to the foregoing without departing from the scope of the present invention.

The invention claimed is:

1. A method, said method comprising:
   determining, by a processor of a computer system, a series of consecutive movements of a mobile device in a mobile network along a path of locations from an origin location of the path at an earliest activity of a plurality of activities of the mobile device to a destination location of the path at a latest activity of the plurality of activities;
   said processor accessing from storage a historical set of routes of the mobile device;
   said processor ascertaining at least one common route from the historical set of routes, wherein the locations in each common route include all of the locations on the path;
   said processor designating a common route of the at least one common route as a traveled route of the mobile device with respect to the series of consecutive movements of the mobile device along the path;
   said processor communicating, to a traffic planning system, the designated common route and other common routes relating to all network activity records generated by a user of the mobile device accessing the mobile network;
   in response to said communicating, said traffic planning system obtaining a real-time view of traffic density along journey paths in a transport infrastructure;
   in response to the real-time view of traffic density along journey paths in the transport infrastructure, said traffic planning system making informed decisions about traffic planning comprising traffic alerts, redirecting traffic, closing roads, and opening new roads along new routes;
   said traffic planning system implementing the informed decisions, said implementing comprising issuing traffic alerts, redirecting traffic, closing roads, and opening new roads along new routes;
   said processor computing a ratio of (i) a sum of a coverage area of a start cell in which one activity of the mobile device was initiated and a coverage area of an end cell in which the one activity of the mobile device was terminated to (ii) a distance between a centroid of the start cell and a centroid of the end cell such that the distance has a positive value; and
   said processor determining a confidence value as a function of the computed ratio.

2. The method of claim 1, wherein the origin location of each common route is the origin location of the path, and wherein the destination location of each common route is the destination location of the path.

3. The method of claim 1, said method further comprising:
   said processor analyzing a network usage record that identifies the plurality of activities of the mobile device and associated activity information pertaining to each activity, wherein for each activity the associated activity information identified in the network usage record includes a start cell in which the activity was initiated, an end cell in which the activity was terminated, a start time at which the activity was initiated, and a time duration of the activity, said plurality of activities comprising the one activity,
   wherein said determining the series of consecutive movements of the mobile device along the path of locations comprises determining the series of consecutive movements of the mobile device along the path of locations from the activity information of the activities.

4. The method of claim 3, wherein the start time and duration for each activity defines a time interval that does not overlap the time interval defined for each other activity.

5. The method of claim 1, wherein said ascertaining ascertains that the locations on the common route comprise at least one intermediate location not on the path.

6. The method of claim 1, wherein said ascertaining ascertains that the at least one common route consists of a plurality of routes, and wherein the plurality of routes include routes of varying length.

7. The method of claim 6, wherein said designating designates a longest route of the plurality of routes as the common route.

8. The method of claim 7, wherein the longest route comprises all other routes of the plurality of routes.

9. The method of claim 1, wherein said determining the series of consecutive movements of the mobile device along the path comprises determining that a longest time interval between consecutive activities of the consecutive movements is less than a specified time interval threshold.

10. The method of claim 1, wherein an activity of the plurality of activities of the mobile device is selected from the group consisting of a voice call, a video call, a Short Message (SMS), a Service Multimedia Message Service (MMS), and a data access and download.

11. A computer program product, comprising a one or more computer readable hardware storage devices having computer readable program code stored therein, said program code containing instructions which, upon being executed by one or more processors of a computer system, implement a method, said method comprising:
   said one or more processors determining a series of consecutive movements of a mobile device in a mobile network along a path of locations from an origin location of the path at an earliest activity of a plurality of activities of the mobile device to a destination location of the path at a latest activity of the plurality of activities;
   said one or more processors accessing from storage a historical set of routes of the mobile device;
   said one or more processors ascertaining at least one common route from the historical set of routes, wherein the locations in each common route include all of the locations on the path;
   said processor designating a common route of the at least one common route as a traveled route of the mobile device with respect to the series of consecutive movements of the mobile device along the path;

said one or more processors communicating, to a traffic planning system, the designated common route and other common routes relating to all network activity records generated by a user of the mobile device accessing the mobile network;

in response to said communicating, said traffic planning system obtaining, via the one or more processors, a real-time view of traffic density along journey paths in a transport infrastructure;

in response to the real-time view of traffic density along journey paths in the transport infrastructure, said traffic planning system making, via the one or more processors, informed decisions about traffic planning comprising traffic alerts, redirecting traffic, closing roads, and opening new roads along new routes;

said traffic planning system implementing, via the one or more processors, the informed decisions, said implementing comprising issuing traffic alerts, redirecting traffic, closing roads, and opening new roads along new routes;

said one or more processors computing a ratio of (i) a sum of a coverage area of a start cell in which one activity of the mobile device was initiated and a coverage area of an end cell in which the one activity of the mobile device was terminated to (ii) a distance between a centroid of the start cell and a centroid of the end cell such that the distance has a positive value; and said one or more processors determining a confidence value as a function of the computed ratio.

12. The computer program product of claim 11, wherein the origin location of each common route is the origin location of the path, and wherein the destination location of each common route is the destination location of the path.

13. The computer program product of claim 11, said method further comprising:

said one or more processors analyzing a network usage record that identifies the plurality of activities of the mobile device and associated activity information pertaining to each activity, wherein for each activity the associated activity information identified in the network usage record includes a start cell in which the activity was initiated, an end cell in which the activity was terminated, a start time at which the activity was initiated, and a time duration of the activity, said plurality of activities comprising the one activity, wherein said determining the series of consecutive movements of the mobile device along the path of locations comprises determining the series of consecutive movements of the mobile device along the path of locations from the activity information of the activities.

14. The computer program product of claim 13, wherein the start time and duration for each activity defines a time interval that does not overlap the time interval defined for each other activity.

15. A computer system comprising one or more processors, one or more memories, and one or more computer readable storage devices, said one or more storage devices containing program code configured to be executed by the one or more processors via the one or more memories to implement a method, said method comprising:

said one or more processors determining a series of consecutive movements of a mobile device in a mobile network along a path of locations from an origin location of the path at an earliest activity of a plurality of activities of the mobile device to a destination location of the path at a latest activity of the plurality of activities;

said one or more processors accessing from storage a historical set of routes of the mobile device;

said one or more processors ascertaining at least one common route from the historical set of routes, wherein the locations in each common route include all of the locations on the path;

said one or more processors designating a common route of the at least one common route as a traveled route of the mobile device with respect to the series of consecutive movements of the mobile device along the path;

said one or more processors communicating, to a traffic planning system, the designated common route and other common routes relating to all network activity records generated by a user of the mobile device accessing the mobile network;

in response to said communicating, said traffic planning system obtaining, via the one or more processors, a real-time view of traffic density along journey paths in a transport infrastructure;

in response to the real-time view of traffic density along journey paths in the transport infrastructure, said traffic planning system making, via the one or more processors, informed decisions about traffic planning comprising traffic alerts, redirecting traffic, closing roads, and opening new roads along new routes;

said traffic planning system implementing, via the one or more processors, the informed decisions, said implementing comprising issuing traffic alerts, redirecting traffic, closing roads, and opening new roads along new routes;

said one or more processors computing a ratio of (i) a sum of a coverage area of a start cell in which one activity of the mobile device was initiated and a coverage area of an end cell in which the one activity of the mobile device was terminated to (ii) a distance between a centroid of the start cell and a centroid of the end cell such that the distance has a positive value; and said one or more processors determining a confidence value as a function of the computed ratio.

16. The computer system of claim 15, wherein the origin location of each common route is the origin location of the path, and wherein the destination location of each common route is the destination location of the path.

17. The computer system of claim 15, said method further comprising:

said one or more processors analyzing a network usage record that identifies the plurality of activities of the mobile device and associated activity information pertaining to each activity, wherein for each activity the associated activity information identified in the network usage record includes a start cell in which the activity was initiated, an end cell in which the activity was terminated, a start time at which the activity was initiated, and a time duration of the activity, said plurality of activities comprising the one activity, wherein said determining the series of consecutive movements of the mobile device along the path of locations comprises determining the series of consecutive movements of the mobile device along the path of locations from the activity information of the activities.

18. The computer system of claim 17, wherein the start time and duration for each activity defines a time interval that does not overlap the time interval defined for each other activity.

* * * * *